United States Patent [19]

Mattiussi et al.

[11] Patent Number: 5,084,134
[45] Date of Patent: Jan. 28, 1992

[54] PROCESS FOR THE DEVOLATILIZATION OF POLYMER SOLUTIONS

[75] Inventors: Andrea Mattiussi, Milan; Claudio Buonerba; Franco Balestri, both of Mantova; Dino Dall'Acqua, Mestre; Savino Matarrese, Verona; Italo Borghi, Ferrara, all of Italy

[73] Assignee: Montedipe S.r.L., Milan, Italy

[21] Appl. No.: 641,614

[22] Filed: Jan. 16, 1991

Related U.S. Application Data

[63] Continuation of Ser. No. 383,011, Jul. 21, 1989, abandoned.

[30] Foreign Application Priority Data

Jul. 16, 1988 [IT] Italy ................ 21481 A/88

[51] Int. Cl.$^5$ ............................ B01D 1/00; B01D 3/06
[52] U.S. Cl. .................................... 159/47.1; 159/2.1; 159/23; 159/28.6; 159/43.1; 159/DIG. 10; 159/DIG. 16; 159/DIG. 32; 203/88; 264/102; 523/340; 528/501
[58] Field of Search ............. 159/2, 1, 23, 47.1, 159/28.6, DIG. 10, DIG. 32, 43.1, DIG. 16; 202/205; 293/91, 88; 264/101, 102; 165/166; 528/501, 481, 502, 503; 523/324, 340

[56] References Cited

U.S. PATENT DOCUMENTS

| | | | |
|---|---|---|---|
| 2,941,985 | 6/1960 | Amos et al. .............. | 159/DIG. 10 |
| 3,365,808 | 1/1968 | James, Jr. et al. .......... | 159/DIG. 10 |
| 3,453,184 | 7/1969 | Gemassmer et al. ......... | 203/88 |
| 3,679,368 | 7/1972 | Balint et al. ............. | 159/DIG. 10 |
| 3,741,272 | 6/1973 | Ullrich et al. ............. | 159/DIG. 10 |
| 3,865,672 | 2/1975 | Metzinger et al. .......... | 159/47.1 |
| 3,966,538 | 6/1976 | Hagberg ................. | 159/DIG. 10 |
| 3,980,529 | 9/1976 | Wilhelm et al. ........... | 159/DIG. 10 |
| 4,153,501 | 5/1979 | Fink et al. ............... | 159/27.4 |
| 4,400,236 | 8/1983 | Hanamura et al. ......... | 159/DIG. 10 |
| 4,808,236 | 2/1989 | Aneja ................... | 159/47.1 |

FOREIGN PATENT DOCUMENTS 226204 12/1986 European Pat. Off. .

OTHER PUBLICATIONS

Polymer Engineering and Scinece, Aug. 1978, vol. 18, No. 10, pp. 812-816, "Kinetic Studies on Shear Degradation of Polystyrene During".

Heat Transfer Engineering, "Analysis and Design for Viscous Flow Cooler", vol. 5, Nos. 1 & 2 (1984) by Scott Lynn and Charles Oldershaw.

*Primary Examiner*—Virginia Manoharan
*Attorney, Agent, or Firm*—Morgan & Finnegan

[57] ABSTRACT

A process for the devolatilization of polymer solutions including:
(a) feeding the solution to a zone of indirect thermal exchange in which the ratio between the surface of thermal exchange and the flow per hour of the solution is over 80 m$^2$/m$^3$/h;
(b) moving the solution forward into each channel at a speed below 0.5 mm/second;
(c) keeping the solution of the polymer in each channel for about 120–200 seconds; and
(d) separating the volatile components from the devolatilized polymer solution.

15 Claims, 3 Drawing Sheets

PROCESS FOR THE DEVOLATILIZATION OF POLYMER SOLUTIONS

This is a continuation of co-pending application Ser. No. 07/383,011, filed on July 21, 1989, now abandoned.

DESCRIPTION OF THE INVENTION

The present invention relates to a method for removing the volatile components from polymer solutions.

More particularly, the present invention relates to a method for removing the volatile components from polymer solutions having a high viscosity by indirect heating.

The removal of the volatile components from very viscous polymer solutions is an operation which often recurs in the production of a great many polymers. In particular, in the mass or solution polymerization of ethylenically unsaturated monomers and in polymerization by polycondensation, the removal of the remaining monomers, of the solvent, and of other volatile materials from the solution containing the polymer is a necessary operation.

As known, the separation of the polymer from the volatile components is generally achieved by evaporation, consisting in heating the polymer solution at a temperature higher than the boiling temperature of the volatile components. The methods and apparatus used for this purpose may be regarded as a function of the viscosity of the polymer solution. When the polymeric solution is fluid, i.e., its viscosity is below $10^6$ centipoises, a thin layer evaporator may be used in which the solution is heated while flowing along the inner surface of the evaporator.

A bladed rotor provides for spreading and moving the solution to be treated forward along the devolatizator walls.

However, by using these types of devolatizator, one cannot achieve a very high removal of the volatile substances, unless use is made of apparatus having a large volume which leads to a very expensive operation owing to the required energy.

Moreover, these thin layer evaporators impart considerable shearing strengths to the polymer and sometimes they may cause a deterioration of the physical properties thereof.

For more viscous solutions, such as for instance solutions having a viscosity over $10^6$ centipoises, the devolatilization may be achieved by using ventilated extruders. These extruders, however, involve a higher operating cost besides a high starting cost. Moreover, by using these apparatus the thermodegradation of the polymer cannot be avoided completely.

This is due chiefly to the fact that the degradation phenomena of the materials arise owing to the high viscous dissipation and/or to the high residence time of the fluid to be treated in the evaporator.

Various attempts to overcome this drawback, by increasing or by lowering the treatment temperature did not lead to any satisfactory result, as a temperature increase in the treatment chamber involves a more sensible thermal degradation of the material; whereas a lowering of the temperature leads to an increase in the fluid viscosity and as a consequence causes a more sensible mechanical degradation.

In fact, as is well known, the degradation of materials having thermosensitive characteristics depends on the residence time in the treatment chamber, on the viscous dissipation, and on the treatment temperature, as described in Polymer Engineering and Science, August 1978, Vol. 18, No. 10, pages 812-816.

Methods and apparatus are also known for the devolatilization of polymer solutions by indirect heating. These methods are often independent of the polymer viscosity but they are not free from drawbacks and limitations as well.

The polymer solutions are very often subjected to high temperatures for long periods of time, which cause undesired degradation of the polymer chiefly if the latter is very sensitive to heat, such as for instance polystyrene or copolymers or mixtures thereof. This degradation involves a discoloration and/or a degradation of physical-chemical properties of the polymer such as for instance the toughness. To overcome these drawbacks it was proposed to subject the solution to intermediate temperatures, protracting the residence time in the zone of indirect heating. Where this is possible, the drawbacks are either a low productivity due to the low speed through the zone of thermal exchange or the use of very large, and therefore very expensive, apparatus.

U S. Pat. No. 4,153,501 describes a method and apparatus for removing the vaporizable components from the melt of thermoplastic materials by heating gently in a tubular heat exchanger. This method requires a large zone of indirect thermal exchange, which adds to the starting cost and to the operating cost.

Published European patent application No. 226,204 describes a method for removing the volatile components from a polymer solution containing at least 25% by weight of polymers, comprising:

(a) passing the polymer solution through a zone of indirect thermal exchange comprising a plurality of channels having substantially uniform ratio of surface/volume in the range of from 4 to 50, being from about 0.05 to 0.5 inches high and from about 0.5 to 12 inches long, wherein the polymer solution is heated under pressure at a temperature which is above the temperatures of vaporization of the volatile componets and is below the boiling point of the polymer in the solution;

(b) evaporating at least 25% of the volatile components of the polymer solution after it has left the zone of indirect thermal exchange; and (c) separating the volatile components evaporated from the solution of the devolatilized polymer.

The pressure generally ranges from 2 to 200 atmospheres and the temperature is about 160°-300° C.

Although this process avoids the thermal degradation of the polymer, as it lowers the exposure time of the polymer in the solution at the devolatilization temperature, it is not entirely satisfactory, as it does not allow one to achieve a complete devolatilization of the volatile components from the solution, and therefore it requires more than one devolatilization step.

Moreover, the high temperature difference between the wall of the heat exchanger and the polymer solution causes both an imperfect distribution of the solution in the single channels arranged in parallel, with consequent dishomogeneity in the distribution of the temperature and in a non-uniform treatment of the polymer in each channel, as reported by Scott Lynn and Charles F. Oldershaw, Analysis and Design for Viscous Flow Cooler, Heat Transfer Engineering, Vol. 5 Nos. 1-2 (1984).

Therefore an object of the present invention is to provide a process allowing a nearly complete removal of the volatile components from polymer solutions without the above drawbacks.

More particularly, an object of the present invention is to provide a more efficient process for removing in a nearly complete way the volatile components from polymer solutions, without at the same time causing a significant decay of the properties of the polymer.

In accordance with the present invention, therefore, it has now been discovered that the above objects may be achieved by carrying out the process of devolatilization under conditions which allow one to achieve a temperature difference below 10 centigrade degrees between the temperature of the heating medium and the temperature of the polymer solution leaving the channels, and a pressure of the polymer solution in the zone of devolatilization at the inlet of the channels ranging from 2 to $5.10^5$ Pascal.

Therefore an object of the present invention is a process for the devolatilization of polymer solutions comprising:
a) feeding the polymer solution through a zone of indirect thermal exchange comprising a plurality of channels arranged in parallel with respect to each other, heated to a temperature higher than the temperature of vaporation of the volatile components and up to the boiling temperature of the solution, wherein the ratio between the whole surface of thermal exchange, expressed in $m^2$, and the flow per hour of the fed polymer solution, expressed in $m^3/h$ is over 80 $m^2/m^3/h$;
b) moving the polymer solution forward into each channel at a speed below 0.5 mm/second;
c) keeping the polymer solution in each channel for a period of time ranging from 120 to 200 seconds, in order to evaporate at least 90% of the volatile components from said polymer solution; and
d) separating the volatile components from the devolatilized polymer solution.

Moreover, it has been found that this process may be carried out economically by using an apparatus comprising a container equipped with an inlet pipe for the polymer solution, with a drain pipe for the volatile components, with an outlet pipe of the devolatilized polymer solution, and with a heat exchanger located and fastened inside the container.

The heat exchanger comprises a central zone connected to the inlet pipe for the polymer solution to be devolatilized, a plurality of channels surrounding the central zone and extending from said central zone, at which the polymer solution arrives, to the periphery of the heat exchanger, and a plurality of pipes perpendicular to said channels, into which a fluid heating medium flows having a temperature higher than the temperature of vaporization of the volatile components of the polymer solution.

The channels are heated by the pipes in order to bring about the desired thermal exchange and are dimensioned in such a way that the ratio between the surface, expressed in $m^2$, and the flow of the fed polymer solution, expressed in $m^3/h$, is over 80, and the residence time of the polymer solution in each channel ranges from 120 to 200 seconds and the flow speed of the solution through each channel is below 0.5 mm/second.

The vessel is wrapped in a heating jacket thus keeping the temperature inside higher than the evaporation temperature of the volatile components.

A gear pump provides for the discharge of the devolatilized polymer from the vessel.

Any viscous polymer solution may be used in the process of the present invention. These polymer solutions have generally a viscosity in the molten state over 10,000 centipoises and preferably ranging from 100,000 to 1,000,000 centipoises.

The process of the present invention may be used for the devolatilization of thermoplastic polymers, silicone polymers, elastomers, lubricants having a high molecular weight, and the like.

The term thermoplastic polymers, as used herein, comprises polymers that become plastic and flow because of heat and pressure. Examples of such thermoplastic polymers include polystyrene, impact-resistant polystyrene, polyphenylene ethers, polycarbonates, polyvinyl chloride, polyurethanes, polyetherimides, polyamides, polyesters, polyacrylates and polymethacrylates, linear polyethylene, their copolymers such as the styrene-acrylonitrile (ASA or SAN), styrene methyl-methacrylate, styrene-maleic anhydride, styrene-acrylonitrile-rubber such as ABS or AES, styrene-methyl-methacrylate-rubber and the like, as well as mixtures of such polymers and copolymers, such as for instances polyphenyleneether-polystyrene and the like.

Highly viscous polymer solutions containing at least 25% by weight and preferably 40% by weight of polystyrene or of a copolymer of styrene either alone or in mixture with other polymers, are particularly preferred in the process of the present invention.

Examples of silicone polymers are those corresponding to the formula:

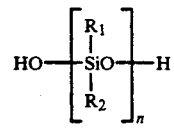

wherein $R_1$ and $R_2$ are monovalent radicals, such as methyl, ethyl, propyl, vinyl, allyl, cyclohexyl, cyclopentyl, phenyl, methyl-phenyl, and the like, and n is a whole number over 100.

Examples of elastomers include diene rubbers, such as polybutadiene, polyisoprene, butylene rubbers, polyisobutylene, ethylene-propylene rubbers, and ethylene-propylene-diene (EPDM) rubbers; homopolymers of vinyl ethers, cyclic esters, methacrylic esters, acrylonitrile, and the like.

As lubricants having a high molecular weight, the hydrocarbons are meant having a boiling point ranging from 370° to 550° C. and comprise n-paraffins, isoparaffins, cycloparaffins, and the like.

Polymer solutions to be subjected to the process of devolatilization of the present invention are the polymer solutions obtained directly by synthesis of the polymers and contain, besides the polymer, starting monomers or mixtures of monomers and solvents, particularly where the polymerization has been carried out in solution. Moreover, said solutions may contain mixtures of polymers and/or additives and/or fillers dissolved or dispersed in the solution.

According to the process of the present invention, the polymer solution is passed through a zone of indirect thermal exchange, wherein the polymer solution is heated by a source of heat through a heat transfer medium which is generally a metal wall.

The source of heat is generally a fluid kept at high temperature and the heat is transferred from the fluid to the polymer solution that is thus heated.

The polymer solution is heated to a temperature higher than the temperature of evaporation of the volatile components and preferably above the glass transition temperature (Tg) of the polymer in solution. The border-line temperature is the boiling temperature of the polymer solution It is preferred to keep the temperature of the polymer solution at least 50 centigrade degrees over the glass transition temperature (Tg) of the polymer. Generally used are temperatures of devolatilization ranging from 100° to 400° C. and preferably ranging from 150° to 350° C.; although temperatures over 300° C. may cause some degradation of the polymer. In the case of polystyrene or of mixtures containing polystyrene, the utilizable temperatures range from 160° to 300° C. and preferably from 180° to 280° C.

In the zone of indirect thermal exchange, the polymer solution is kept under a pressure ranging from 2 to $5.10^5$ Pascal at the inlet of each channel, and at a pressure below the pressure of saturation of the volatile components toward the outlet from the channel.

The residence time of the polymer solution in the indirect heating zone ranges from 120 to 200 seconds, so that at least 90% of the volatile components is eliminated in such zone. Residence times over 200 seconds are not recommended as they may cause an undesired degradation of the polymer.

In order to ensure a quick and efficient transfer of heat and a substantially complete removal of the volatile components from the polymer solution, the ratio of the surface of the heat exchanger (expressed in $m^2$) to the flow of the polymer solution (expressed in $m^3/h$) is kept at values over 80 and up to 150, values ranging from 100 to 110 being preferred Another parameter which allows one to obtain the desired results (high removal of the volatile components) is the flow speed of the solution in the indirect heating zone.

The polymer solution is caused to flow through this zone very slowly and in particular at a speed below 0.5 mm/second; and preferably from 0.3 to 0.4 mm/second.

The zone of indirect thermal exchange comprises a plurality of channels, each of which is preferably from 50 to 150 mm long, from 1 to 3 mm high, and from 10 to 30 mm wide.

The size and shape of the channels are substantially uniform, in order to ensure a regular and uniform flow of the polymer solution therethrough.

In order to insure a quick thermal exchange in each channel and a complete removal of the volatile components, the temperature difference between the heating medium and the polymer solution at the outlet from the channels is kept within values not over 10 centigrade degrees. Any heating means, such as diathermic oil, electric resistances and the like, may be used to heat the surface of the channels.

At the outlets from the channels, the polymer solution is substantially free from volatile components, as such components evaporate in the zone of indirect heating.

Under the conditions of the process of the present invention, the evaporation is quick and complete inside the channels and the polymer solution flows substantially free from volatile components at the outlet of the channels.

The polymer solution is collected on the bottom of the vessel, whereas the volatile components are collected from the top of the same vessel.

These two components may be removed by suitable means such as pumps, suction, gear pumps, and the like.

BRIEF DESCRIPTION OF THE DRAWING

In the accompanying FIGS. 1-7 several embodiments of a heat exchange apparatus are illustrated that are suitable for carrying out the process of the present invention.

More particularly:

Referring to FIG. 1, the devolatilizator according to the present invention comprises a double-walled or lined vessel 16 equipped in the upper part with inlet pipe 1 for the polymer solution; in the side part, with outlet pipe 3 for discharge of the volatile components; and, in the lower part, with an outlet duct 2 for the discharge of the devolatilized polymer solution.

Figure 1:
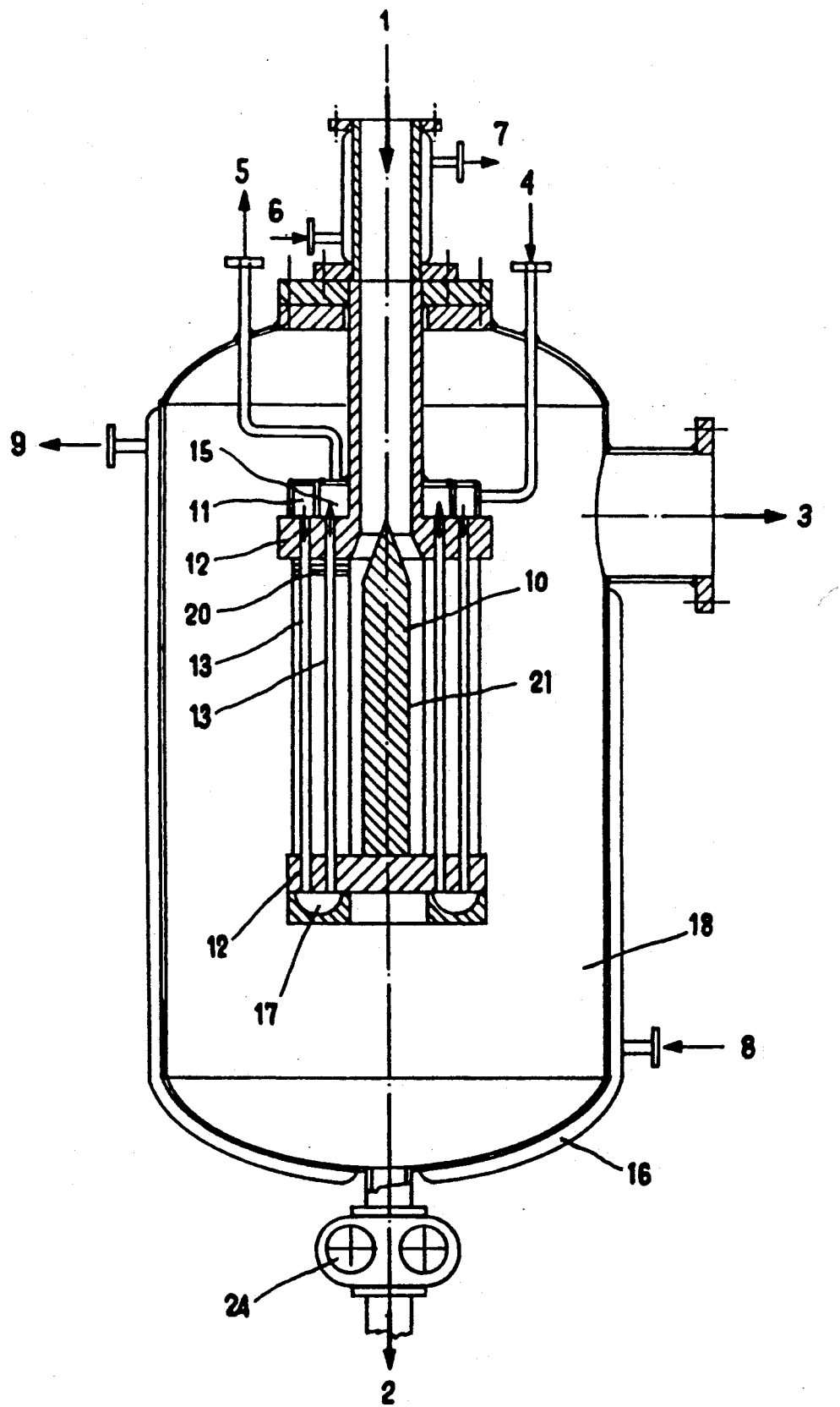
FIG. 1 is a schematic longitudinal side-view of a devolatilizator according to this invention.

Inside vessel 16 a heat exchanger is arranged that comprises a central chamber 21 for receiving the polymer solution to be devolatilized, fed from inlet pipe 1. Around said central chamber 21 a series of horizontal channels 14 is arranged extending from central chamber 21 to the periphery of the heat exchanger. The number of such channels may vary over a wide range, but generally ranges from 1,000 to 100,000. Channels 14 have a rectangular cross section and are from 50 to 150 mm long, from 1 to 3 mm high, and from 10 to 30 mm wide.

Channels 14 are delimited and defined by superimposed and spaced plates 19.

A conventional pump, not illustrated in the figure, is provided for feeding the polymer solution to channels 14 through pipe 1 and chamber 21. In order to better subdivide the polymer solution and to convey it uniformly to channels 14, a central spacer 10 is arranged in the middle of chamber 21. Spacer 10 may have a cylindrical, conical, or frustum-conical shape.

Moreover, the heat exchanger comprises means for heating the surfaces of thermal exchange at a temperature above the temperature of vaporization of the volatile components. Said heating means comprises a first series of pipes 13 arranged at or near the periphery of the heat exchanger and through which the heated fluids, such as diathermic oil from duct 4 through annular chamber 11, is caused to flow. A second series of pipes 13' is arranged in the inner part of the exchanger, which pipes communicate with the first pipes 13 in the lower part through annular chamber 17. Said pipes 13 and 13' pass through openings 22 and 22' in plates 19 and are arranged perpendicularly to the flow of the polymer solution.

Said pipes 13 and 13' are supported at their ends by two plates 12 and 12'.

In the upper part, pipes 13 arranged in the peripheral part of the heat exchanger are connected, through annular chamber 11, to pipe 4 for the feed of the heating fluid; whereas pipes 13', arranged in the innermost part, are connected through annular chamber 15 to pipe 5 for the discharge of the heating fluid.

Vessel 16 is double-walled or lined and is kept at the desired temperature by means of a heating fluid coming from pipe 8 and leaving via pipe 9.

Feeding pipe 1 is lined and kept at the desired temperature by means of a heating fluid coming from pipe 6 and leaving via pipe 7.

Figure 4:
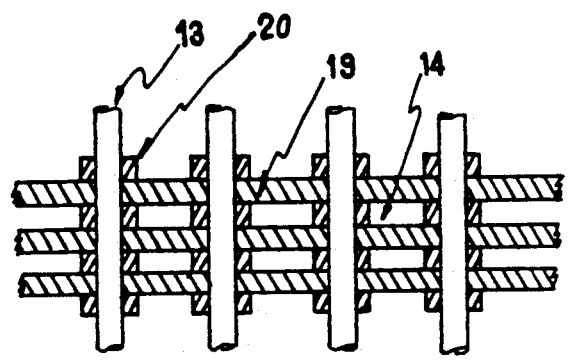
FIGS. 3 and 4 represent perspective and side views, respectively, of the arrangement of the plates of FIG. 2.

Pipes 13 and 13' pass through holes 22 and 22' of a plurality of plates 19 superimposed and spaced from one another by a plurality of spacers 20. (See FIG. 4). In order to ensure a perfect seal and resistance to leakage of pipes 13 and 13', spacers 20 are provided with holes into which said pipes 13 and 13' are inserted. Thus, between the various superimposed plates 19 channels 14 are formed, which extend from the center to the periphery of the heat exchanger and constitute channels for the flow of the polymer solution.

Figure 5:
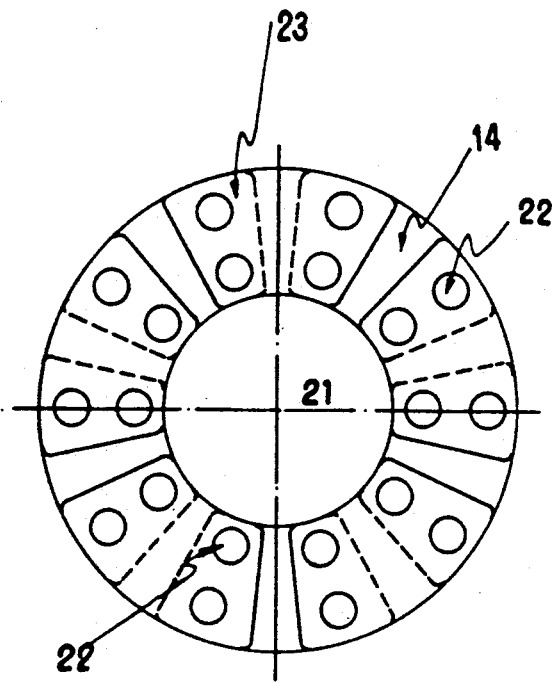
FIG. 5 represents a view from the top of a second kind of plate.
Figure 7:
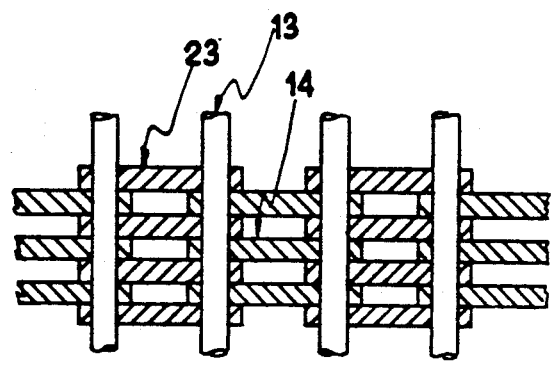
FIGS. 6 and 7 represent schematic perspective and side views, respectively, of the arrangement of the plates of FIG. 5.
Figure 6:
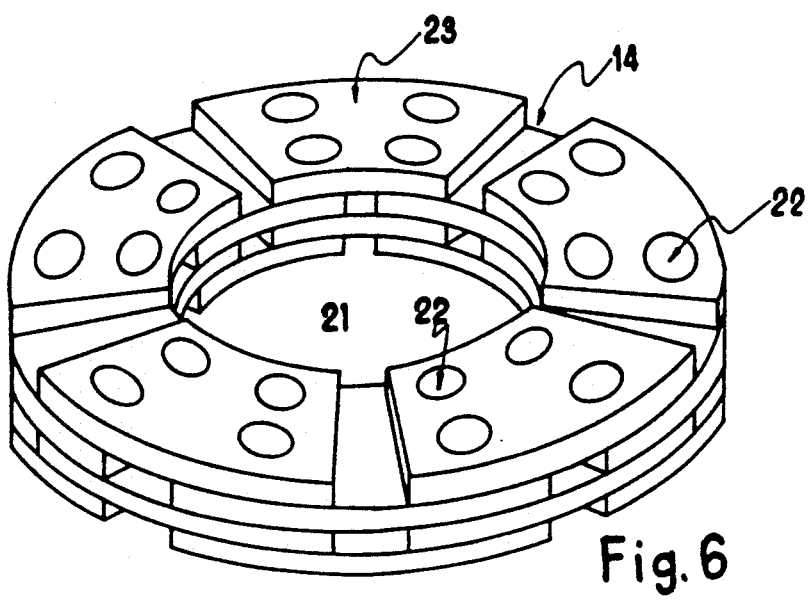

In FIGS. 5-7 an alternative embodiment is illustrated concerning the channels for the flow of the polymer solution. In this case the plates are replaced with a plurality of blocks 23 having a rectangular or isosceles trapezoidal shape, drilled for the passing of two rows of adjacent pipes 13 and 13'.

By arranging blocks 23 in a spaced way on a first layer and in a spaced or staggered way on a subsequent second layer, so that holes 22 and 22' of the superimposed blocks coincide, an annular even plate is provided that extends around the heat exchanger. The subsequent layers are arranged in a staggered way with respect to the next lower layer, in order to form channels 14 extending from the center to the periphery of the heat exchanger, as illustrated in FIGS. 6 and 7.

Figure 2:
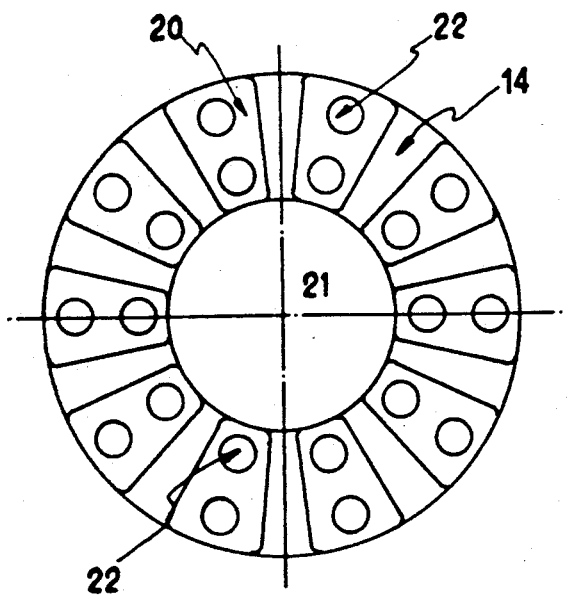
FIG. 2 is a schematic view from the top of a plate within the heat exchanger in the devolatilizator of FIG. 1.
Figure 3:
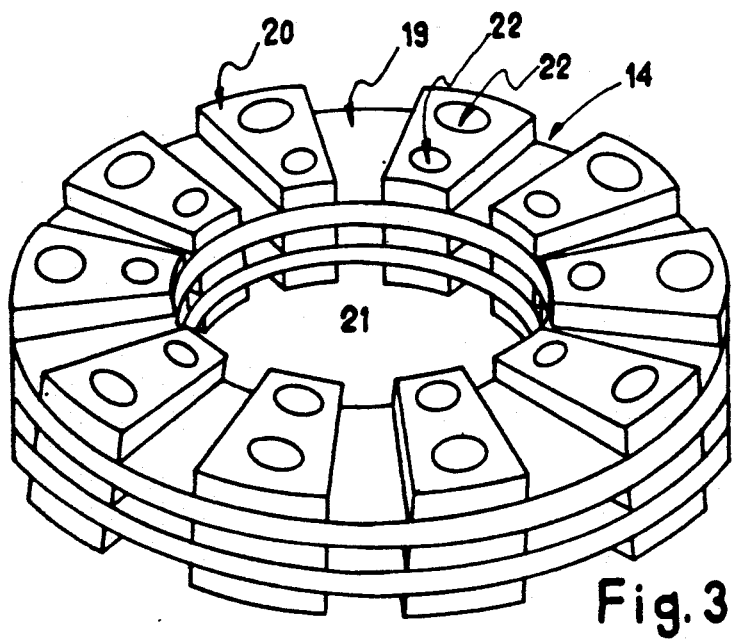

The even plate thermal exchanger according to the present invention may be constructed according to per se known techniques as to the molding and welding. As far as the ducts for the heating fluids are concerned, it is preferred first to assemble the plates of FIGS. 2 to 4 or the blocks of FIGS. 5 to 7 pipes 13 and 13' and subsequently fastened to the whole either by hydraulic or by pneumatic expansion of the pipes. In that way, a perfect metal-metal contact is obtained.

The operation of the devolatizator illustrated in FIG. 1 is the following:

The polymer solution to be treated is fed to pipe 1 through a dosage pump and comes into central chamber 21. From this chamber the solution passes through channels 14, comes out at the end of these channels, falls into the inside 18 of vessel 16, and is discharged at the end of said vessel from duct 2 by means of gear pump 24. The heating fluid at a suitable temperature is fed via duct 4, goes through annular chamber 11, pipes 13, annular chamber 17 and pipes 13' and chamber 15, and exits via duct 5. Vessel 16 is heated by passing a heating fluid in from duct 8 and out via duct 9. The volatile components are removed from duct 3.

EXAMPLES

The following examples will be given in order still better to illustrate this invention, but without limiting the same.

EXAMPLE 1

In this example the devolatizator of FIG. 1 was used. The heat exchanger comprised 1,700 channels, each of them being on the average 16 mm wide, 55 mm long, and 1 mm high. The channels are obtained by using blocks having an isosceles trapezoidal shape superimposed in more layers spaced on each layer, as shown in FIGS. 5-7.

The oil was heated to 250°-300° C. and caused to flow through the pipes.

A vacuum pump was used to remove the volatile components and a gear pump was arranged at the end of the vessel to collect the devolatilized polymer for solution.

A polymer solution containing 50% by weight of polystyrene, 10% of ethyl-benzene and 40% of monomeric styrene was fed at a flow rate of 30 l/h to the devolatilizator at a temperature of about 120° C. and at a pressure at the inlet of about $2.10^5$ Pascal.

The devolatilizator was kept at a residual pressure of $2.10^3$ Pascal and was heated by circulation of a diathermic oil kept at the temperature of 250° C.

The temperature of the polymer leaving the devolatilizator was about 245° C.

The ratio between the surface of thermal exchange of the channels and the fed polymer solution was 106 $m^2m^3/h$.

The speed of the solution in each channel was 0.3 mm/second. The residence time was about 181 seconds. The polymer leaving the devolatilizator had the following characteristics:

residual monomeric styrene: <400 ppm
total volatile components: <500 ppm

EXAMPLE 2

A polymer solution consisting of about 50% by weight of a copolymer styrene-acrylonitrile (75-25% by eight), 20% by weight of ethyl-benzene, 22.5% by weight of monomeric styrene, and 7.5% by weight of acrylonitrile was fed, at a flow rate of about 30 l.h to the devolatilizator of Example 1.

The temperature at the inlet was about 120° C. and the pressure was about $2.10^5$ Pascal.

The devolatilizator was kept at a residual pressure of $2.10^3$ Pascal and was heated by circulation of a diathermic oil kept at the temperature of 230° C.

The temperature of the polymer at outlet was about 225° C.

The ratio between the surface of thermal exchange of the fed polymer solution and the flow speed in the channel were equal to that of Example 1.

The polymer solution leaving the devolatilizator had the following characteristics:

residual monomeric styrene: <500 ppm
residual monomeric acrylonitrile: <20 ppm
total volatile components: <600 ppm.

EXAMPLE 3

A polymer solution consisting of 60% by weight of a copolymer styrene-methyl methacrylate (55-45% by weight), and 20% by weight of a mixture of monomeric styrene and methyl methacrylate in a ratio by weight 55/45, was fed at a flow of about 30 l/h to the devolatilizator of Example 1. The temperature of the solution at the inlet was about 120° C. and the pressure was about $2.10^5$ Pascal.

The devolatilizator was kept at a residual pressure of $2.10^3$ Pascal and heated by circulation of a diathermic oil kept at the temperature of 230° C.

The temperature of the polymer at the outlet was about 225° C.

The polymer leaving the devolatilizator had the following characteristics:
  residual monomeric styrene: <400 ppm
  residual monomeric methyl methacrylate: <20 ppm
  total volatile components: <500 ppm.

EXAMPLE 4

A polymer solution consisting of 65% by weight of a polymethylmethacrylate, 20% by weight of butyl acetate, and 15% by weight of monomeric methyl methacrylate was fed at a flow of about 30 1/h to the devolatilizator of Example 1.

The temperature of the solution at the inlet was 120° C. and its pressure was $4.10^5$ Pascal.

The devolatilizator was kept at a residual pressure of $13.10^3$ Pascal and heated by circulation of a diathermic oil kept at the temperature of 230° C.

The temperature of the polymer leaving the devolatilizator was about 225° C.

The polymer leaving the apparatus had the following characteristics:
  residual monomeric methyl-methacrylate: <1000 ppm
  total volatile components: <2000 ppm.

EXAMPLE 5

A polymer solution consisting of 50% by weight of a copolymer styrene-maleic anhydride (85%-15% by weight), 20% by weight of cyclohexanone, and 30% by weight of monomeric styrene was fed at a flow rate of 30 1/h to the devolatilizator of Example 1. The temperature of the solution at the inlet was 110° C. and its pressure was about $2.10^5$ Pascal.

The devolatilizator was kept at a residual pressure of $2.10^3$ Pascal and heated by a flow of a diathermic oil kept at a temperature of about 230° C.

The temperature of the polymer leaving the devolatilizator was about 225° C.

The polymer leaving the apparatus had the following characteristics:
  residual monomeric styrene: <500 ppm
  total volatile components: <600 ppm.

EXAMPLE 6

A polymer solution consisting of 70% by weight of a copolymer styrene-acrylonitrile-polybutadiene (87.5-22.5-10%) by weight, 20% by weight of ethylbenzene, and 10% by weight of a mixture of styrene and acrylonitrile monomers in the ratio by weight 75/25, was fed at a flow rate of about 30 1/h to the devolatilizator of Example 1.

The temperature of the solution at the inlet was 150° C. and its pressure was about $3.10^5$ Pascal.

The devolatilizator was kept at a residual pressure of $2.10^3$ Pascal and heated by a flow of a diathermic oil kept at a temperature of about 250° C.

The temperature of the polymer leaving the devolatilizator was about 245° C.

The polymer leaving the apparatus had the following characteristics:
  residual monomeric styrene: <500 ppm
  residual monomeric acrylonitrile <20 ppm
  total volatile components: <600 ppm.

EXAMPLE 7

A polymer solution consisting of 40% by weight of a polycarbonate and about 60% by weight of chlorobenzene, was fed at a flow rate of about 30 1/h to the devolatilizator of Example 1.

The temperature of the solution at the inlet was 120° C. and its pressure was about $3.10^5$ Pascal.

The devolatilizator was kept at a residual pressure of $2.10^3$ Pascal and heated by flow of a diathermic oil kept at a temperature of about 295° C.

The temperature of the polymer leaving the devolatilizator was about 290° C.

The content of residual solvent in the solution at the outlet was below 500 ppm.

EXAMPLE 8

A polymer solution consisting of 40% by weight of a mixed polyphenylene oxide-polystyrene 50/50 by weight and 60% by weight of toluene was fed at a flow rate of 30 1/h to the devolatilizator of Example 1.

The temperature of the solution at the inlet was 120° C. and its pressure was about $3.10^5$ Pascal.

The devolatilizator was kept at a residual pressure of $3.10^3$ Pascal and heated by a flow of a diathermic oil kept at a temperature of about 295° C.

The temperature of the polymer leaving the devolatilizator was 295° C.

The content in residual solvent in the polymer at the outlet was below 1,000 ppm.

EXAMPLE 9

A polymer solution consisting of 65% by weight of a linear low density polyethylene (LLDPE) and 35% by weight of cyclohexanone was fed at a flow rate of 30 1/h to the devolatilizator of Example 1.

The temperature of the solution at the inlet was 170° C. and its pressure was about $3.10^5$ Pascal.

The devolatilizator was kept at a residual pressure of $2.10^3$ Pascal and heated by a flow of a diathermic oil kept at a temperature of 250° C.

The temperature of the polymer leaving the devolatilizator was about 245° C.

The content in residual solvent in the polymer leaving the devolatilizator was below 10 ppm.

EXAMPLE 10

A polymer solution consisting of 65% by weight of high density polyethylene (HDPE) and 35% by weight of cyclohexanone was fed at a flow rate of 30 1/h to the devolatilizator of Example 1.

The temperature of the solution at the inlet was 170° C. and its pressure was about $3.10^5$ Pascal.

The devolatilizator was kept at a residual pressure of $2.10^3$ Pascal and heated by a flow of a diathermic oil kept at a temperature of 250° C.

The temperature of the polymer leaving the devolatilizator was about 245° C.

The content in residual solvent in the polymer leaving the devolatilizator was below 10 ppm.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A process for the devolatilization of polymer solutions consisting of:
   (a) feeding the polymer solution to a zone of indirect thermal exchange comprising a plurality of channels arranged in parallel with respect to one another, heated to a temperature higher than the temperature of vaporization of the volatile components and up to the boiling temperature of the solution, wherein the ratio between the whole surface of thermal exchange, expressed in m², and the flow per hour of the fed polymer solution, expressed in m³/h, is above 80 m²/m³/h;

(b) moving the polymer solution forward into each channel at a speed below 0.5 mm/second and the pressure of the polymer solution at the inlet of the channels ranges from 2 to $5.10^5$ Pascal;

(c) keeping the polymer solution in each channel for a period of time ranging from 120 to 200 seconds, in order to evaporate at least 90% of the volatile components from said polymer solution;

(d) separating the volatile components from the devolatilized polymer solution;

(e) wherein the temperature of the polymer solution is at least 50 centigrade degrees over a glass transition temperature Tg of the polymer; and (f) wherein the difference between the temperature of a heating medium and that of the polymer solution leaving the channels is below 10 centigrade degrees.

2. A process according to claim 1, wherein the polymer solution has a viscosity in the molten state over 10,000 centipoises.

3. A process according to claim 1, wherein the polymer solution has a viscosity in the molten state ranging from 100,000 to 1,000,000 centipoises.

4. A process according to claim 1, wherein the polymer is selected from the group consisting of thermoplastic polymers, silicone polymers, elastomers, and lubricants having a high molecular weight.

5. A process according to claim 4, wherein the thermoplastic polymer is selected from the group consisting of polystyrene, impact-resistant polystyrene, polyphenylene ethers, polycarbonates, polyvinyl chloride, polyurethanes, polyetherimides, polyamides, polyesters, polyacrylates, polymethacrylates, linear polyethylene and mixtures thereof.

6. A process according to claim 5, wherein the thermoplastic polymer is a mixture of polyphenylene ether polystyrene.

7. A process according to claim 1, wherein the polymer is selected from the group consisting of copolymers styrene-acrylonitrile, styrene methyl-methacrylate, styrene-maleic anhydride, and styrene-acrylonitrile-rubber.

8. A process according to claim 1, wherein the polymer solution contains at least 25% by weight or at least 40% by weight of polystyrene or of a copolymer of polystyrene.

9. A process according to claim 1, wherein the temperature of the polymer solution ranges from 100° to 400° C.

10. A process according to claim 1, wherein the temperature of the polymer solution ranges from 150° to 350° C.

11. A process according to claim 1, wherein the pressure of the polymer solution is lower than the pressure of saturation of the volatile components toward the outlet of each channel.

12. A process according to claim 1, wherein the ratio between the surface of the exchanger expressed in m² and the flow per hour of the polymer solution expressed in m³/h ranges from above 80 to 150.

13. A process according to claim 1, wherein the ratio between the surface of the exchanger expressed in m² and the flow per hour of the polymer solution expressed in m³/h ranges from 100 to 110.

14. A process according to claim 1, wherein the speed of the polymer solution in each channel ranges from 0.3 to 0.4 mm/second.

15. A process according to claim 1, wherein the zone of thermal exchange comprises from 1,000 to 100,000 channels and each channel is from 50 to 150 mm long, from 1 to 3 mm high, and from 10 to 30 mm wide.

* * * * *